US009790308B2

(12) United States Patent
Han et al.

(10) Patent No.: US 9,790,308 B2
(45) Date of Patent: Oct. 17, 2017

(54) ALKYL ACRYLATE-AROMATIC VINYL COMPOUND-VINYL CYANIDE COMPOUND COPOLYMER WITH IMPROVED LOW-TEMPERATURE IMPACT STRENGTH AND POLYCARBONATE COMPOSITION COMPRISING THE SAME

(71) Applicant: LG CHEM, LTD., Seoul (KR)

(72) Inventors: Hye Kyung Han, Daejeon (KR); Yong Yeon Hwang, Daejeon (KR); Min Jung Kim, Daejeon (KR); Chun Ho Park, Daejeon (KR); Sang Mi Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 619 days.

(21) Appl. No.: 14/234,304

(22) PCT Filed: Sep. 24, 2013

(86) PCT No.: PCT/KR2013/008519
§ 371 (c)(1),
(2) Date: Jan. 22, 2014

(87) PCT Pub. No.: WO2014/058163
PCT Pub. Date: Apr. 17, 2014

(65) Prior Publication Data
US 2016/0304651 A1    Oct. 20, 2016

(30) Foreign Application Priority Data

Oct. 11, 2012  (KR) .................. 10-2012-0112794
Oct. 11, 2012  (KR) .................. 10-2012-0112800
Oct. 11, 2012  (KR) .................. 10-2012-0112802
Oct. 11, 2012  (KR) .................. 10-2012-0112805
Sep. 17, 2013  (KR) .................. 10-2013-0111868

(51) Int. Cl.
*C08L 51/04*     (2006.01)
*C08F 265/04*    (2006.01)
*C08L 69/00*     (2006.01)
*C08F 285/00*    (2006.01)
*C08F 291/02*    (2006.01)

(52) U.S. Cl.
CPC .......... *C08F 265/04* (2013.01); *C08F 285/00* (2013.01); *C08F 291/02* (2013.01); *C08L 69/00* (2013.01); *C08L 51/04* (2013.01)

(58) Field of Classification Search
CPC ........................ C08F 265/04; C08L 51/04
See application file for complete search history.

(56) References Cited

U.S. PATENT DOCUMENTS

| | | | | |
|---|---|---|---|---|
| 9,353,255 B2 * | 5/2016 | Kim | ...................... | C08F 291/12 |
| 2005/0159529 A1 * | 7/2005 | O | ...................... | C08F 257/02 |
| | | | | 524/458 |
| 2007/0010618 A1 * | 1/2007 | Chen | ...................... | C08L 69/00 |
| | | | | 525/65 |
| 2010/0028546 A1 * | 2/2010 | Roschmann | ......... | C09D 133/10 |
| | | | | 427/385.5 |
| 2010/0144971 A1 * | 6/2010 | Babcock | ................. | C08L 67/04 |
| | | | | 525/64 |
| 2011/0269894 A1 * | 11/2011 | Miyamoto | ................ | C08F 2/24 |
| | | | | 524/532 |

FOREIGN PATENT DOCUMENTS

| | | | |
|---|---|---|---|
| CN | 1697850 A | | 11/2005 |
| CN | 102311527 B | | 1/2012 |
| KR | 1020020038554 A | | 5/2002 |
| KR | 1020070071446 A | | 7/2007 |
| KR | 1020080045798 A | | 5/2008 |
| KR | 1020080112205 A | | 12/2008 |
| KR | 1020090040111 A | | 4/2009 |
| KR | 1020100013443 A | | 2/2010 |
| KR | 1020120004261 A | | 1/2012 |
| WO | WO 2013/115610 | * | 8/2013 |

OTHER PUBLICATIONS

LG Chemical, Derwent Abstract ACC-NO 2013-M20749, Aug. 2013.*

* cited by examiner

*Primary Examiner* — Jeffrey Mullis
(74) *Attorney, Agent, or Firm* — Dentons US LLP

(57) ABSTRACT

Disclosed are an alkyl acrylate-aromatic vinyl compound-vinyl cyanide compound copolymer which is prepared using a polyalkylene cross-linking agent such as polyethylene glycol diacrylate or polyethylene glycol dimethacrylate for a core of the alkyl acrylate-aromatic vinyl compound-vinyl cyanide compound copolymer and thus advantageously improves low-temperature impact strength of resins when the copolymer is applied to a polycarbonate resin composition, and the polycarbonate resin composition comprising the copolymer.

12 Claims, No Drawings

US 9,790,308 B2

ALKYL ACRYLATE-AROMATIC VINYL COMPOUND-VINYL CYANIDE COMPOUND COPOLYMER WITH IMPROVED LOW-TEMPERATURE IMPACT STRENGTH AND POLYCARBONATE COMPOSITION COMPRISING THE SAME

This application is a 35 USC §371 National Stage entry of International Application No. PCT/KR2013/008519, filed on Sep. 24, 2013, and claims priority of Korean Application Nos. KR 10-2012-0112794 filed Oct. 11, 2012; KR 10-2012-0112800 filed Oct. 11, 2012; KR 10-2012-0112802 filed Oct. 11, 2012; KR 10-2012-0112805 filed Oct. 11, 2012; and KR 10-2013-0111868 filed Sep. 17, 2013.

TECHNICAL FIELD

The present invention relates to an acrylic copolymer and a polycarbonate composition comprising the same. More specifically, the present invention relates to an alkyl acrylate-aromatic vinyl compound-vinyl cyanide compound copolymer which has an effect of improving low-temperature impact strength of resins by preparing an acrylate-styrene-acrylonitrile copolymer using a polyalkylene cross-linking agent for a core of the copolymer and applying the acrylate-styrene-acrylonitrile copolymer to a polycarbonate resin composition, and the polycarbonate resin composition comprising the same.

BACKGROUND ART

Vehicle exterior materials or cellular phone housings are often exposed to low-temperature environments during use and are readily exposed to light sources such as ultraviolet rays. In addition, these materials require high heat resistance to endure hot sunlight and high tensile strength.

Products utilizing, as a main resin, a polycarbonate resin having superior heat resistance, dimensional stability and tensile strength have been developed so as to provide resin compositions satisfying these properties.

However, polycarbonate resins are disadvantageously readily brittle due to poor low-temperature impact strength and room-temperature impact strength. Accordingly, an attempt to improve impact strength using a rubber-reinforced thermoplastic resin as an impact reinforcing agent has been made.

General rubber-reinforced thermoplastic resins include acrylonitrile-butadiene-styrene (ABS) resins, acrylonitrile-styrene-acrylonitrile (ASA) resins, methyl methacrylate-butadiene-styrene (MBS) resins, acrylic impact modifier (AIM) resins and the like. These resins utilize a rubber polymer having a glass transition temperature of 0° C. or less as a core and a shell layer selected in consideration of compatibility with a matrix resin is produced through graft copolymerization.

In general, ABS resins prepared by graft copolymerizing a butadiene rubber polymer with styrene and acrylonitrile monomers have impact resistance, processability, beautiful appearance, superior mechanical strength and high heat deflection temperature and are thus utilized in a variety of applications such as vehicle components, electronic and electrical products and constructional materials.

However, ABS resins are readily oxidized by ultraviolet rays, light and heat in the presence of oxygen, are changed in appearance and color and have a drawback of deteriorated mechanical properties due to presence of ethylenically unsaturated polymer in a butadiene rubber used as an impact reinforcing agent, thus being disadvantageously unsuitable for use as outdoor materials.

Accordingly, in order to obtain thermoplastic resins having superior physical properties as well as excellent weather resistance and aging resistance, an ASA resin which is an acrylate-styrene-acrylonitrile terpolymer utilizing an acrylic rubber free of an ethylenically unsaturated polymer is used as an impact reinforcing agent, instead of a butadiene rubber. Such an ASA resin is utilized in a variety of applications including electronic and electrical components, constructional materials, vehicles, ships, leisure products and gardening materials for outdoor use.

ASA is generally prepared as multilayer copolymer graft particles, that is, core-shell structures. An acrylic rubber for improving impact resistance is generally used as the core and styrene, acrylonitrile, methyl methacrylate or the like for improving colorability and dispersibility with a matrix resin is generally used as the shell.

However, when an ASA impact reinforcing agent is added to a commonly used polycarbonate (PC), low-temperature impact strength may be slightly deteriorated. Accordingly, in an attempt to improve low-temperature impact strength, an amount of added ASA has been increased. However, this attempt causes deterioration in other property such as tensile strength. Thus, there is a need for acrylate-styrene-acrylonitrile resins which are capable of improving low-temperature impact strength while not deteriorating other properties.

DISCLOSURE

Technical Problem

Therefore, the present invention has been made in view of the above problems, and it is an object of the present invention to provide an acrylic copolymer having superior impact strength, in particular, low-temperature impact strength and a polycarbonate resin composition comprising the same.

The object of the present invention can be accomplished by the present invention described below.

Technical Solution

In accordance with one aspect of the present invention, the above and other objects can be accomplished by the provision of an alkyl acrylate-aromatic vinyl compound-vinyl cyanide compound copolymer comprising (A) a seed comprising at least one selected from the group consisting of an aromatic vinyl compound, a vinyl cyanide compound and alkyl acrylate, (B) a rubber core surrounding the seed, the rubber core comprising alkyl acrylate and a polyalkylene cross-linking agent, and (C) a graft shell surrounding the rubber core, the graft shell comprising at least one selected from the group consisting of an aromatic vinyl compound and a vinyl cyanide compound.

The alkyl acrylate-aromatic vinyl compound-vinyl cyanide compound copolymer may comprise (A) a seed comprising 4 to 30 parts by weight of at least one selected from the group consisting of an aromatic vinyl compound, a vinyl cyanide compound and alkyl acrylate, (B) a rubber core surrounding the seed, the rubber core comprising 20 to 80 parts by weight of alkyl acrylate and 0.01 to 3 parts by weight of a polyalkylene cross-linking agent, and (C) a cross-linked graft shell surrounding the rubber core, the cross-linked graft shell comprising 10 to 70 parts by weight of at least one selected form the group consisting of an aromatic vinyl compound and a vinyl cyanide compound, and 0.01 to 3 parts by weight of a cross-linking agent, with respect to 100 parts by weight in total of the alkyl acrylate, the aromatic vinyl compound and the vinyl cyanide compound.

The polyalkylene cross-linking agent may comprise at least one selected from the group consisting of polyethylene glycol diacrylate, polyethylene glycol dimethacrylate, polypropylene glycol diacrylate and polypropylene glycol dimethacrylate.

The polyalkylene cross-linking agent may have a number average molecular weight of 250 to 1,000 g/mol.

At least one of the seed and the core may further comprise a grafting agent.

The grafting agent may comprise at least one selected from the group consisting of allyl methacrylate, triallyl isocyanurate, triallyl amine and diallyl amine.

The grafting agent may be present in an amount of 0.01 to 0.5 parts by weight.

The aromatic vinyl compound may comprise at least one selected from the group consisting of styrene, α-methyl styrene, p-methyl styrene and vinyl toluene.

The vinyl cyanide compound may comprise at least one selected from the group consisting of acrylonitrile, methacrylonitrile and ethacrylonitrile.

The alkyl acrylate may have an alkyl group having 2 to 8 carbon atoms.

The graft shell may further comprise a polyalkylene cross-linking agent.

In another aspect of the present invention, provided is a polycarbonate resin composition comprising 1 to 20% by weight of the alkyl acrylate-aromatic vinyl compound-vinyl cyanide compound copolymer, and 80 to 99% by weight of a polycarbonate resin.

The polycarbonate resin composition may comprise 1 to 20% by weight of the alkyl acrylate-aromatic vinyl compound-vinyl cyanide compound copolymer, 62 to 97% by weight of the polycarbonate resin, and 1 to 20% by weight of the acrylonitrile-styrene copolymer.

In another aspect of the present invention, provided is an exterior material comprising the polycarbonate resin composition.

The exterior material may comprise a vehicle exterior material or a cellular phone exterior material.

Advantageous Effect

A polycarbonate resin composition comprising an alkyl acrylate-aromatic vinyl compound-vinyl cyanide compound copolymer prepared according to the present invention advantageously exhibits superior impact strength, in particular, low-temperature impact strength.

BEST MODE

Hereinafter, the present invention will be described in detail.

In one embodiment of the present invention, a polycarbonate resin composition comprises: 80 to 99% by weight of a polycarbonate resin; and 1 to 20% by weight of an alkyl acrylate-aromatic vinyl compound-vinyl cyanide compound copolymer, wherein the alkyl acrylate-aromatic vinyl compound-vinyl cyanide compound copolymer comprises: (A) a seed comprising at least one selected from the group consisting of an aromatic vinyl compound, a vinyl cyanide compound and alkyl acrylate; (B) a rubber core surrounding the seed, the rubber core comprising an alkyl acrylate monomer and a polyalkylene cross-linking agent; and (C) a graft shell surrounding the rubber core, the graft shell comprising at least one selected from the group consisting of an aromatic vinyl compound and a vinyl cyanide compound.

As used herein, the expression "polymer (for example, seed or core) comprising a monomer" means a polymer prepared by polymerizing the monomer alone or a combination of the monomer with a comonomer.

In another embodiment of the present invention, a polycarbonate resin composition comprises: 62 to 97% by weight of a polycarbonate resin; 1 to 20% by weight of an alkyl acrylate-aromatic vinyl compound-vinyl cyanide compound copolymer; and 1 to 20% by weight of an acrylonitrile-styrene copolymer, wherein the alkyl acrylate-aromatic vinyl compound-vinyl cyanide compound copolymer comprises: (A) a seed comprising at least one selected from the group consisting of an aromatic vinyl compound, a vinyl cyanide compound and alkyl acrylate; (B) a rubber core surrounding the seed, the rubber core comprising an alkyl acrylate monomer and a polyalkylene cross-linking agent; and (C) a graft shell surrounding the rubber core, the graft shell comprising at least one selected from the group consisting of an aromatic vinyl compound and a vinyl cyanide compound.

The alkyl acrylate-aromatic vinyl compound-vinyl cyanide compound copolymer comprises: (A) a seed comprising 4 to 30 parts by weight of at least one selected from the group consisting of an aromatic vinyl compound, a vinyl cyanide compound and alkyl acrylate; (B) a rubber core surrounding the seed, the rubber core comprising 20 to 80 parts by weight of an alkyl acrylate monomer and 0.01 to 3 parts by weight of a cross-linking agent selected from the group consisting of polyethylene glycol diacrylate, polyethylene glycol dimethacrylate, polypropylene glycol diacrylate and polypropylene glycol dimethacrylate; and (C) a cross-linked graft shell surrounding the rubber core, the cross-linked graft shell comprising 10 to 70 parts by weight of at least one selected form the group consisting of an aromatic vinyl compound and a vinyl cyanide compound, and 0.01 to 3 parts by weight of a cross-linking agent, with respect to 100 parts by weight of the total monomer used for preparation of the alkyl acrylate-aromatic vinyl compound-vinyl cyanide compound copolymer.

The polyalkylene cross-linking agent may comprise at least one selected from the group consisting of polyalkylene glycol diacrylate and polyalkylene glycol dimethacrylate, and more specifically, the polyalkylene cross-linking agent may comprise at least one selected from the group consisting of polyethylene glycol diacrylate (PEGDA), polyethylene glycol dimethacrylate (PEGDMA), polypropylene glycol diacrylate (PPGDA) and polypropylene glycol dimethacrylate (PPGDMA). For example, the polyalkylene cross-linking agent is polyethylene glycol diacrylate, but the present invention is not limited thereto. In addition, the polyalkylene cross-linking agent has a number average molecular weight of 250 to 1,000 g/mol, or 250 to 700 g/mol. The aromatic vinyl compound may comprise at least one selected from the group consisting of styrene, α-methyl styrene, p-methyl styrene and vinyl toluene and is for example styrene, but the present invention is not limited thereto.

The vinyl cyanide compound may comprise at least one selected from the group consisting of acrylonitrile, methacrylonitrile and ethacrylonitrile, and is, for example, acrylonitrile, but the present invention is not limited thereto.

The alkyl acrylate may contain an alkyl group having 2 to 8 carbon atoms, and is, for example, methyl acrylate, ethyl acrylate or butyl acrylate wherein an alkyl moiety has 1 to 4 carbon atoms, but the present invention is not limited thereto.

The alkyl acrylate-aromatic vinyl compound-vinyl cyanide compound copolymer is, for example, acrylate-styrene-acrylonitrile (ASA).

A method for preparing the alkyl acrylate-aromatic vinyl compound-vinyl cyanide compound copolymer according to an embodiment includes: (a) polymerizing a monomer mixture comprising a monomer comprising 4 to 30 parts by weight of at least one selected from the group consisting of an aromatic vinyl compound, a vinyl cyanide compound and alkyl acrylate, 0.001 to 1 part by weight of an electrolyte, 0.01 to 1 part by weight of a cross-linking agent, 0.01 to 3 parts by weight of a grafting agent, 0.01 to 3 parts by weight of an initiator and 0.01 to 5 parts by weight of an emulsifier to prepare a seed; (b) a monomer mixture comprising 20 to 80 parts by weight of an alkyl acrylate monomer, 0.01 to 3 parts by weight of a polyalkylene cross-linking agent, 0.01 to 3 parts by weight of an initiator and 0.01 to 5 parts by weight of an emulsifier in the presence of the seed to prepare a rubber core; and (c) polymerizing a monomer mixture comprising 10 to 70 parts by weight of at least one selected from the group consisting of an aromatic vinyl compound and a vinyl cyanide compound, 0.01 to 3 parts by weight of an initiator, and 0.01 to 5 parts by weight of an emulsifier in the presence of the rubber core, to prepare a cross-linked graft shell, with respect to 100 parts by weight of the total monomer used for preparation of the alkyl acrylate-aromatic vinyl compound-vinyl cyanide compound copolymer.

The polyalkylene cross-linking agent may be selected from the group consisting of polyethylene glycol diacrylate, polyethylene glycol dimethacrylate, polypropylene glycol diacrylate and polypropylene glycol dimethacrylate.

The aromatic vinyl compound used for the steps (a) and (c) may comprise at least one selected from the group consisting of styrene, α-methyl styrene, p-methyl styrene and vinyl toluene, and is preferably styrene, but the present invention is not limited thereto.

The vinyl cyanide compound used for the steps (a) and (c) may comprise at least one selected from the group consisting of acrylonitrile, methacrylonitrile and ethacrylonitrile, and is preferably acrylonitrile, but the present invention is not limited thereto.

The alkyl acrylate used for the steps (a) and (b) contains an alkyl group having 2 to 8 carbon atoms, is preferably methyl acrylate, ethyl acrylate or butyl acrylate wherein alkyl moiety has 1 to 4 carbon atoms, but the present invention is not limited thereto.

In the present invention, a polyalkylene cross-linking agent having a number average molecular weight of 250 or more may be used in the step (b) and is for example a cross-linking agent having a number average molecular weight of 250 to 1,000. Specifically, low-temperature impact strength of a polycarbonate resin composition comprising the alkyl acrylate-aromatic vinyl compound-vinyl cyanide compound copolymer is further improved using a polyalkylene cross-linking agent selected from the group consisting of polyethylene glycol diacrylate (PEGDA), polyethylene glycol dimethacrylate (PEGDMA), polypropylene glycol diacrylate (PPGDA) and polypropylene glycol dimethacrylate (PEGDMA).

In addition, a grafting agent may be further added to the polyalkylene cross-linking agent. The grafting agent may be allyl methacrylate (AMA), triallyl isocyanurate (TRIC), triallyl amine (TAA), diallyl amine (DAA) or the like.

The polymerization of the step (c) may be carried out further using 0.01 to 3 parts by weight of a cross-linking agent.

The cross-linking agent of the step (C) may comprise at least one selected from the group consisting of divinyl benzene, ethylene glycol dimethacrylate, diethylene glycol dimethacrylate, triethylene glycol dimethacrylate, 1,3-butanediol dimethacrylate, ethylene glycol diacrylate, hexanediol ethoxylate diacrylate, hexanediol propoxylate diacrylate, neopentyl glycol dimethacrylate, neopentyl glycol ethoxylate diacrylate, neopentyl glycol propoxylate diacrylate, trimethylolpropane trimethacrylate, trimethylolethane triacrylate, trimethylpropane ethoxylate triacrylate, trimethylpropane propoxylate triacrylate, pentaerythritol ethoxylate triacrylate, pentaerythritol propoxylate triacrylate and vinyltrimethoxysilane, and is preferably divinyl benzene, but the present invention is not limited thereto.

In addition, the cross-linking agent of the step (C) may be a polyalkylene cross-linking agent.

The emulsifier used for the steps (a), (b) and (c) is not particularly limited and examples thereof include anionic surfactants, non-ionic surfactants, cationic surfactants, amphoteric surfactants and the like.

Of these, the emulsifier is particularly preferably an anionic surfactant selected from the group consisting of alkenyl succinate metal salts, alkylbenzene sulfonate, aliphatic sulfonate, ester sulfate of higher alcohols, α-olefin sulfonate and alkyl ether ester sulfate.

The electrolyte may be KCl, NaCl, $KHCO_3$, $NaHCO_3$, $K_2CO_3$, $Na_2CO_3$, $KHSO_3$, $NaHSO_4$, $Na_2S_2O_7$, $K_4P_2O_7$, $K_3PO_4$, $Na_3PO_4$, $Na_2HPO_4$ or a combination of two or more thereof.

The initiator used for the steps (a), (b) and (c) is not particularly limited and is preferably a radical initiator. The radical initiator may comprise at least one selected from inorganic peroxides such as sodium persulfate, potassium persulfate, ammonium persulfate, potassium perphosphate and hydrogen peroxide, organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butyl peroxy isobutyrate, and azobisisobutyronitrile, azobis-2,4-dimethylvaleronitrile, azobis cyclohexanecarbonitrile and azobis methyl isobutyrate. Of the radical initiators, inorganic peroxides are more preferred and persulfates are particularly preferred.

An activator for facilitating initiation reaction of persulfates may be used together with the polymerization initiator and the activator is preferably sodium formaldehyde, sulfoxylate, sodium ethylene diamine, tetraacetate, ferrous sulfate, dextrose, sodium pyrophosphate or sodium sulfite alone or in combination of two or more thereof.

The grafting agent of the step (a) may be allyl methacrylate (AMA), triallyl isocyanurate (TRIC), triallyl amine (TAA), diallyl amine (DAA) or the like.

Polymerization temperature during emulsion polymerization is not particularly limited, is generally 50 to 85° C. and is preferably 60 to 80° C.

The alkyl acrylate-aromatic vinyl compound-vinyl cyanide compound copolymer according to the present invention preferably includes a seed having a mean particle diameter of 0.1 to 0.3 μm. When the mean particle diameter is lower than 0.1 μm, low-temperature impact strength is deteriorated and when the mean particle diameter exceeds 0.3 μm, latex stability is disadvantageously deteriorated.

In addition, the alkyl acrylate-aromatic vinyl compound-vinyl cyanide compound copolymer of the present invention preferably includes a rubber core having a mean particle diameter of 0.15 to 0.5 μm.

The polycarbonate composition may utilize or may not utilize an acrylonitrile-styrene copolymer according to desired application.

The thermoplastic resin composition may further include a generally used additive, such as dye, pigment, lubricant, anti-oxidant, UV stabilizer, thermal stabilizer, reinforcing agent, filler, flame retardant, plasticizer or matt agent, according to intended application.

Exterior materials, specifically, vehicle exterior materials or cellular phone exterior materials, may be produced using the polycarbonate resin composition according to the present invention.

In addition, the present invention provides a thermoplastic resin composition comprising: 80 to 99% by weight of a polycarbonate resin; and 1 to 20% by weight of the alkyl acrylate-aromatic vinyl compound-vinyl cyanide compound copolymer prepared by the method, or a thermoplastic resin composition comprising: 62 to 99% by weight of a polycarbonate resin; 1 to 20% by weight of the alkyl acrylate-aromatic vinyl compound-vinyl cyanide compound copolymer prepared by the method; and 1 to 20% by weight of an acrylonitrile-styrene copolymer, with respect to the polycarbonate resin.

Hereinafter, preferred examples will be provided for better understanding of the present invention. These examples are only provided to illustrate the present invention and it will be apparent to those skilled in the art that various modifications and alterations are possible within the scope and technical range of the present invention. Such modifications and alterations fall within the scope of claims included herein.

EXAMPLE

Example 1

Preparation of Hard Polymer Seed 40 parts by weight of distilled water was added to a nitrogen-substituted polymerization reactor, a temperature of the reactor was elevated to 75° C., 0.025 parts by weight of potassium persulfate was batchwise added to initiate reaction, and a mixture comprising 5 parts by weight of styrene, 0.05 parts by weight of $Na_2CO_3$, 0.025 parts by weight of ethylene glycol dimethacrylate, 0.025 parts by weight of allyl methacrylate and 0.05 parts by weight of sodium lauryl sulfate was continuously added thereto at 75° C. to prepare a hard polymer seed having a mean particle diameter of 0.1 μm.

Preparation of Rubber Polymer Core

A mixture comprising 60 parts by weight of distilled water, 55 parts by weight of butyl acrylate, 0.3 parts by weight of polyethylene glycol diacrylate (molecular weight: 258), 0.3 parts by weight of allyl methacrylate, 0.5 parts by weight of cumene hydroperoxide and 0.5 parts by weight of sodium lauryl sulfate was continuously added at 75° C. in the presence of the hard polymer seed latex prepared above to prepare a rubber polymer core having a mean particle diameter of 0.3 μm.

Preparation of Cross-Linked Graft Shell

A mixture comprising 50 parts by weight of distilled water, 30 parts by weight of styrene, 10 parts by weight of acrylonitrile, 0.5 parts by weight of divinyl benzene, 0.5 parts by weight of cumene hydroperoxide and 0.65 parts by weight of sodium lauryl sulfate was continuously added at 75° C. in the presence of the prepared rubber polymer core and at the same time, polymerization was performed. In addition, after completion of addition of the mixture, the mixture was further reacted at 75° C. for one hour so as to improve polymerization conversion and cooled to 60° C. to complete the polymerization reaction, thereby preparing a graft copolymer latex. A polymerization conversion of the prepared graft copolymer latex was 98% and a solid content thereof was 40%.

Preparation of Graft Copolymer Powder

The prepared acrylate-styrene-acrylonitrile graft copolymer latex was aggregated using an aqueous sulfuric acid at 80° C. and at room pressure, was then aged at 95° C., dehydrated and washed, and dried in hot air at 90° C. for 30 minutes to prepare an acrylate-styrene-acrylonitrile graft copolymer powder.

Example 2

A graft copolymer powder was prepared in the same manner as Example 1, except that during preparation of the rubber polymer core of Example 1, 0.3 parts by weight of polyethylene glycol dimethacrylate (molecular weight: 330) was used, instead of PEGDA.

Example 3

A graft copolymer powder was prepared in the same manner as Example 1, except that during preparation of the rubber polymer core of Example 1, 0.3 parts by weight of PEGDA (molecular weight: 575) was used, instead of PEGDA (molecular weight: 258).

Example 4

A graft copolymer powder was prepared in the same manner as Example 1, except that during preparation of the rubber polymer core of Example 1, 0.3 parts by weight of PEGDA (molecular weight: 700) was used, instead of PEGDA (molecular weight: 258).

Example 5

A graft copolymer powder was prepared in the same manner as Example 1, except that during preparation of the cross-linked graft shell of Example 1, 1 part by weight of divinyl benzene was used, instead of 0.5 parts by weight of divinyl benzene.

Example 6

A graft copolymer powder was prepared in the same manner as Example 1, except that during preparation of the rubber polymer core of Example 1, 0.3 parts by weight of PEGDA (molecular weight: 330) was used, instead of PEGDA (molecular weight: 258).

Comparative Example 1

A graft copolymer powder was prepared in the same manner as Example 1, except that during preparation of the rubber polymer core of Example 1, 0.3 parts by weight of ethylene glycol dimethacrylate (EGDMA) was used, instead of PEGDA (molecular weight: 258).

Comparative Example 2

A graft copolymer powder was prepared in the same manner as Example 1, except that during preparation of the rubber polymer core of Example 1, 0.6 parts by weight of allyl methacrylate (AMA) was used, instead of PEGDA (molecular weight: 258).

Comparative Example 3

A graft copolymer powder was prepared in the same manner as Example 1, except that, 0.3 parts by weight of ethylene glycol dimethacrylate (EGDMA) was used, instead of PEGDA (molecular weight: 258), during preparation of the rubber polymer core of Example 1, and divinyl benzene was not used during preparation of the cross-linked graft shell.

Test Example

<Preparation of PC/ASA Alloy Resin>

2 parts by weight of a lubricant, 2 parts by weight of an anti-oxidant and 3 parts by weight of a UV stabilizer were added to 12 parts by weight of graft copolymer powders prepared in Examples 1 to 6 and Comparative Examples 1 to 3, 18 parts by weight of a styrene-acrylonitrile copolymer (90HR® produced by LC Chem. Ltd.) as a hard matrix, and 70 parts by weight of polycarbonate (PC1300-10® produced by LC Chem. Ltd.), followed by mixing. The resulting mixture was pelletized at a cylinder temperature of 300° C. using a 40ϕ extrusion kneader, the pellet was injection-molded to produce samples for measuring properties and the following physical properties were measured and shown in Table 1.

Izod impact strength (⅛" notched at (23° C., −30° C.), kg·cm/cm)—measured in accordance with ASTM D256. The sample was placed at −30° C. for 5 hours or longer in a low-temperature chamber and low-temperature impact strength of the sample was measured within 3 seconds after taking out of the low-temperature chamber.

Tensile strength (50 mm/min, kg/cm$^2$): measured in accordance with ASTM D638.

TABLE 1

| | Test Example | | | | | | | | |
|---|---|---|---|---|---|---|---|---|---|
| | 1 | 2 | 3 | 4 | 5 | 6 | 8 | 9 | 10 |
| Graft copolymer (ASA) | Example 1 | Example 2 | Example 3 | Example 4 | Example 5 | Example 6 | Comparative Example 1 | Comparative Example 2 | Comparative Example 3 |
| Tensile strength | 556 | 554 | 553 | 551 | 553 | 554 | 554 | 552 | 548 |
| Impact strength (23° C.) | 76.7 | 77 | 79 | 81.5 | 85.5 | 78 | 76.7 | 73.6 | 61.9 |
| Low-temperature impact strength (−30° C.) (kg · cm/cm) | 28.3 | 28.0 | 29.2 | 30.1 | 24.5 | 28.9 | 22.1 | 21.1 | 19 |

As can be seen from Table 1, when an acrylate-styrene-acrylonitrile copolymer prepared using a cross-linking agent such as PEGDA for a core was incorporated into a polycarbonate resin in accordance with Test Examples 1 to 6, impact strength, in particular, low-temperature impact strength at −30° C., of the resin was improved and physical properties such as tensile strength were maintained, as compared to Test Examples 8 to 10 not using a cross-linking agent such as PEGDA.

Meanwhile, it can be seen that Test Example 9 in which a cross-linking agent such as PEGDA was not used for preparation of the core and a cross-linking agent was not used for preparation of the graft shell exhibited deterioration in both room-temperature impact strength and low-temperature impact strength.

<Preparation of PC Containing Impact Reinforcing Agent>

2 parts by weight of a lubricant, 2 parts by weight of an anti-oxidant and 3 parts by weight of a UV stabilizer were added to 3 parts by weight of graft copolymer powders prepared in Examples 1 to 6 and Comparative Examples 1 to 3, and 97 parts by weight of polycarbonate (PC1300-10®, produced by LC Chem. Ltd.), followed by mixing. The resulting mixture was pelletized at a cylinder temperature of 300° C. using a 40ϕ extrusion kneader, the pellet was injection-molded to produce samples for measuring properties and the following physical properties were measured and are shown in Table 2.

TABLE 2

| | Test Example | | | | | | | | |
|---|---|---|---|---|---|---|---|---|---|
| | 11 | 12 | 13 | 14 | 15 | 16 | 18 | 19 | 20 |
| Graft copolymer (ASA) | Example 1 | Example 2 | Example 3 | Example 4 | Example 5 | Example 6 | Comparative Example 1 | Comparative Example 2 | Comparative Example 3 |
| Tensile strength | 596 | 597 | 594 | 593 | 598 | 597 | 588 | 594 | 591 |
| Impact strength (23° C.) | 83.2 | 84.1 | 84.5 | 85.2 | 86.3 | 84.6 | 82.3 | 81.1 | 76.3 |
| Low-temperature impact strength (−30° C.) (kg · cm/cm) | 16.8 | 16.8 | 16.9 | 17.2 | 16.8 | 16.9 | 15.2 | 15.8 | 15.5 |

As can be seen from Table 2, when an acrylate-styrene-acrylonitrile copolymer prepared using a cross-linking agent such as PEGDA for a core was incorporated into a polycarbonate resin in accordance with Test Examples 11 to 16, impact strength, in particular, low-temperature impact strength at −30° C., of the resin was improved and physical properties such as tensile strength were maintained, as compared to Test Examples 18 to 20 not using a cross-linking agent such as PEGDA.

Meanwhile, it can be seen that Test Example 20 in which a cross-linking agent such as PEGDA was not used for preparation of the core and a cross-linking agent was not used for preparation of the graft shell exhibited deterioration in both room-temperature impact strength and low-temperature impact strength.

What is claimed is:

1. An alkyl acrylate-aromatic vinyl compound-vinyl cyanide compound copolymer comprising:
   (A) a seed comprising 4 to 30 parts by weight of at least one selected from the group consisting of an aromatic vinyl compound, a vinyl cyanide compound and alkyl acrylate;
   (B) a rubber core surrounding the seed, the rubber core comprising 20 to 80 parts by weight of alkyl acrylate and 0.01 to 3 parts by weight of a polyalkylene glycol-based cross-linking agent; and
   (C) a graft shell surrounding the rubber core, the graft shell comprising 10 to 70 parts by weight of at least one selected from the group consisting of an aromatic vinyl compound and a vinyl cyanide compound, and 0.01 to 3 parts by weight of the cross-linking agent,
   with respect to 100 parts by weight in total of the alkyl acrylate, the aromatic vinyl compound and the vinyl cyanide compound,
   wherein the polyalkylene glycol-based cross-linking agent comprises at least one selected from the group consisting of polyethylene glycol diacrylate, polyethylene glycol dimethacrylate, polypropylene glycol diacrylate and polypropylene glycol dimethacrylate, and
   wherein the polyalkylene glycol-based cross-linking agent has a number average molecular weight of 575 to 1,000 g/mol.

2. The alkyl acrylate-aromatic vinyl compound-vinyl cyanide compound copolymer according to claim 1, wherein at least one of the seed and the core further comprises a grafting agent.

3. The alkyl acrylate-aromatic vinyl compound-vinyl cyanide compound copolymer according to claim 2, wherein the grafting agent comprises at least one selected from the group consisting of allyl methacrylate, triallyl isocyanurate, triallyl amine and diallyl amine.

4. The alkyl acrylate-aromatic vinyl compound-vinyl cyanide compound copolymer according to claim 2, wherein the grafting agent is present in an amount of 0.01 to 0.5 parts by weight with respect to 100 parts by weight in total of the alkyl acrylate, the aromatic vinyl compound and the vinyl cyanide compound.

5. The alkyl acrylate-aromatic vinyl compound-vinyl cyanide compound copolymer according to claim 1, wherein the aromatic vinyl compound comprises at least one selected from the group consisting of styrene, α-methyl styrene, p-methyl styrene and vinyl toluene.

6. The alkyl acrylate-aromatic vinyl compound-vinyl cyanide compound copolymer according to claim 1, wherein the vinyl cyanide compound comprises at least one selected from the group consisting of acrylonitrile, methacrylonitrile and ethacrylonitrile.

7. The alkyl acrylate-aromatic vinyl compound-vinyl cyanide compound copolymer according to claim 1, wherein the alkyl acrylate has an alkyl group having 2 to 8 carbon atoms.

8. The alkyl acrylate-aromatic vinyl compound-vinyl cyanide compound copolymer according to claim 1, wherein the graft shell further comprises a polyalkylene glycol-based cross-linking agent.

9. A polycarbonate resin composition comprising:
   1 to 20% by weight of an alkyl acrylate-aromatic vinyl compound-vinyl cyanide compound copolymer; and
   80 to 99% by weight of a polycarbonate resin,
   wherein the alkyl acrylate-aromatic vinyl compound-vinyl cyanide compound copolymer comprises:
   (A) a seed comprising at least one selected from the group consisting of an aromatic vinyl compound, a vinyl cyanide compound and alkyl acrylate;
   (B) a rubber core surrounding the seed, the rubber core comprising alkyl acrylate and a polyalkylene glycol-based cross-linking agent; and
   (C) a graft shell surrounding the rubber core, the graft shell comprising at least one selected from the group consisting of an aromatic vinyl compound and a vinyl cyanide compound,
   wherein the polyalkylene glycol-based cross-linking agent comprises at least one selected from the group consisting of polyethylene glycol diacrylate, polyethylene glycol dimethacrylate, polypropylene glycol diacrylate and polypropylene glycol dimethacrylate, and wherein the polyalkylene glycol-based cross-linking agent has a number average molecular weight of 575 to 1,000 g/mol.

10. A polycarbonate resin composition comprising:

1 to 20% by weight of Ma an alkyl acrylate-aromatic vinyl compound-vinyl cyanide compound copolymer;

62 to 97% by weight of a polycarbonate resin; and 1 to 20% by weight of an acrylonitrile-styrene copolymer, wherein the alkyl acrylate-aromatic vinyl compound-vinyl cyanide compound copolymer comprises:

(A) a seed comprising at least one selected from the group consisting of an aromatic vinyl compound, a vinyl cyanide compound and alkyl acrylate;

(B) a rubber core surrounding the seed, the rubber core comprising alkyl acrylate and a polyalkylene glycol-based cross-linking agent; and (C) a graft shell surrounding the rubber core, the graft shell comprising at least one selected from the group consisting of an aromatic vinyl compound and a vinyl cyanide compound, wherein the polyalkylene glycol-based cross-linking agent comprises at least one selected from the group consisting of polyethylene glycol diacrylate, polyethylene glycol dimethacrylate, polypropylene glycol diacrylate and polypropylene glycol dimethacrylate, and wherein the polyalkylene glycol-based cross-linking agent has a number average molecular weight of 575 to 1,000 g/mol.

11. An exterior material comprising the polycarbonate resin composition according to claim 10.

12. The exterior material according to claim 11, wherein the exterior material comprises a vehicle exterior material or a cellular phone exterior material.

* * * * *